United States Patent [19]

Tanabe

[11] 4,258,601

[45] Mar. 31, 1981

[54] BANDSAW BLADE GUIDING APPARATUS FOR BANDSAW MACHINES

[75] Inventor: Hiromichi Tanabe, Hadano, Japan

[73] Assignee: Amada Company, Limited, Isehara, Japan

[21] Appl. No.: 76,168

[22] Filed: Sep. 17, 1979

[30] Foreign Application Priority Data

Sep. 16, 1978 [JP] Japan ............................ 53-126065[U]

[51] Int. Cl.³ ...................... B23D 55/08; B27B 13/10; B26D 1/54
[52] U.S. Cl. ....................................... 83/820; 83/823; 83/827
[58] Field of Search ................. 83/820, 821, 823, 827, 83/828, 829

[56] References Cited

U.S. PATENT DOCUMENTS

| 3,068,734 | 12/1962 | Braun | 83/820 X |
| 3,104,576 | 9/1963 | Robinson | 83/820 X |
| 3,396,615 | 8/1968 | Miller et al. | 83/820 X |
| 3,534,647 | 10/1970 | Mills | 83/820 |

Primary Examiner—Donald R. Schran
Attorney, Agent, or Firm—Thompson, Birch, Gauthier & Samuels

[57] ABSTRACT

A bandsaw machine has a bandsaw blade frictionally held between opposed first and second guide members. A removably adjustable pressing plate member is connected to the second guide member. The second guide member is movable towards and away from the first guide member in response to adjustable movement of the pressing plate member. A lever-actuated cam acts on the pressing plate member to movably adjust the same.

4 Claims, 3 Drawing Figures

BANDSAW BLADE GUIDING APPARATUS FOR BANDSAW MACHINES

BACKGROUND OF THE INVENTION

1. Field of the Invention

The present invention relates generally to bandsaw machines of the type having a flexible endless bandsaw blade trained around a plurality of wheels or pulleys to perform a cutting operation and, more particularly, pertains to a guiding apparatus for holding and guiding the bandsaw blade in the bandsaw machine.

2. Description of the Prior Art

The conventional bandsaw machine usually comprises a flexible endless bandsaw blade trained around wheels or pulleys, one of which is driven to drive the bandsaw blade during a cutting operation. One of the stretches of the bandsaw blade trained around the wheels is slidably held or guided by a pair of guide means at the cutting zone so that the bandsaw blade will cut into a workpiece without lateral motion and with reduced vibration. Especially in horizontal bandsaw machines in which the saw head assembly carrying the bandsaw blade is lowered to feed the bandsaw blade into the workpiece, the blade has to be twisted by the guide means to keep the cutting edge of the same faced toward the workpiece. More particularly, the bandsaw blade must be slidably twisted at the cutting zone by the guide means to keep the cutting edge faced vertically downwardly toward the workpiece, since the wheels carrying the bandsaw blade are so disposed that their axes do not lie in a vertical plane but are tilted.

Conventionally, each such guide means comprises a pair of guide members between which the bandsaw blade is slidably inserted with its sides contacted thereby at the cutting zone. One of the guide members is fixedly mounted, and the other one is releasably and adjustably mounted so as to be moved toward and away from the fixed guide member. In this arrangement, the movable guide member is released from the fixed guide member when it is desired to detach the bandsaw blade, and also it is moved toward the fixed guide member to slidably hold the bandsaw blade therebetween.

Heretofore, the movable guide member has been so arranged as to be moved toward and away from the fixed guide member by a screw member. With such an arrangement, difficulties have been encountered in releasing and tightening the screw member to release and hold the bandsaw blade between the fixed and movable guide members each time it is desired to change the bandsaw blade. Also, there is the possibility that the screw member will be improperly adjusted (either too tightly or too loosely), in which event the bandsaw blade is liable to be improperly held by the guide members. In addition, experience has shown that the screw member may become stuck due to rusting or contamination by dust. Furthermore, since it cannot be seen from outside whether the screw member has been tightened to cause the guide members to hold the bandsaw blade, it has often occurred that the bandsaw blade is put into operation without being held by the guide members with the result that the bandsaw blade will be damaged or broken. This may also result in the workpiece being damaged. The screw-member also makes for a bulky arrangement which restricts its adaptability to the available confined spaces of the bandsaw machine.

In order to overcome the disadvantages of the arrangement using the screw member, attempts have been made at employing hydraulically actuated guide means. However, such alternative arrangements have been found to be unduly costly, complicated, subject to maintenance problems, and more bulky than the arrangements using screw members.

SUMMARY OF THE INVENTION

It is an object of the present invention to provide a bandsaw blade guiding apparatus for bandsaw machines which can be easily operated to detach and install the bandsaw blade.

It is another object of the present invention to provide a bandsaw guiding apparatus for bandsaw machines which is essentially free from operational problems.

It is a further object of the present invention to provide a bandsaw blade guiding apparatus for bandsaw machines in which it is easily seen whether the bandsaw blade is properly held and guided.

It is a still further object of the present invention to provide a bandsaw blade guiding apparatus for bandsaw machines which is simple and compact in construction.

It is therefore a further object of the present invention to provide an inexpensive and economical bandsaw blade guiding apparatus for bandsaw machines.

Basically, these objects can be accomplished by providing a bandsaw blade guiding apparatus with a lever means having a cam for yieldingly urging the bandsaw blade by means of a spring member.

Other and further objects and advantages of the present invention will be apparent from the following description and accompanying drawings which, by way of illustration, show a preferred embodiment of the present invention and the principle thereof.

DESCRIPTION OF THE PREFERRED EMBODIMENTS

Figure 1:
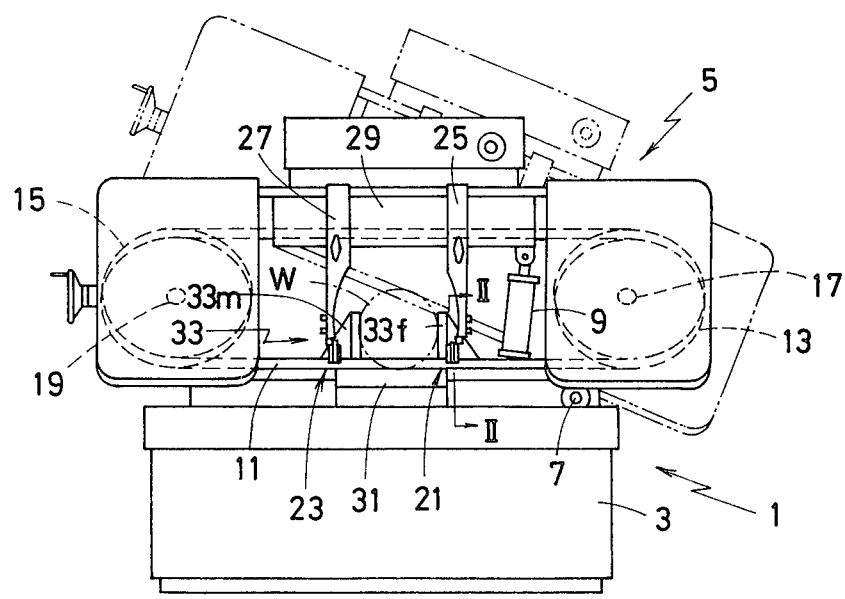
FIG. 1 is a front elevational view of a horizontal bandsaw machine embodying the principles of the present invention.

Referring now to FIG. 1, there is shown a horizontal bandsaw machine which is generally designated by the numeral 1 and which includes a box-like base 3 and a saw head assembly 5 vertically movable toward and away from the base 3. The saw head assembly 5 is pivotally connected to the base 3 by means of a hinge pin 7 and is so arranged as to be raised and lowered away from and toward the base 3 by a hydraulic piston-cylinder motor 9. In the saw head assembly 5, a flexible endless bandsaw blade 11 is trained around a pair of driving and driven wheels 13 and 15 having shafts 17 and 19, respectively. The bandsaw blade 11 at the cutting zone of the horizontal bandsaw machine 1 is slidably held or guided with its cutting edge faced vertically downwardly by a pair of guide assemblies 21 and 23 which will be described in great detail hereinafter. The guide assemblies 21 and 23 are mounted at the lower ends of depending arm members 25 and 27, respectively, which are adjustably held by a beam member 29 fixed at the upper portion of the saw head assembly 5. Also, a work-table 31 is mounted at the cutting zone on the base 3 so that a workpiece W to be cut may be placed thereon, and a vise assembly 33 having a fixed jaw 33f and a movable jaw 33m is also mounted on the base 3 to hold the workpiece W to be cut therebetween. Thus, when the saw head assembly 5 is swung downwardly about the hinge pin 7 from its raised position shown by the imaginary lines in FIG. 1, the bandsaw blade 11 rotating around the driving and driven wheels 13 and 15 in the saw head assembly 5 will cut the workpiece W held by the vise assembly 33 on the work-table 31.

In this connection, it should be noted that the present invention is applicable to any suitable known type of bandsaw machines, although the invention has been and will be described hereinbefore and hereinafter with regard to the horizontal bandsaw machine 1 in which the saw head assembly 5 carrying the bandsaw blade 11 is swung up and down around the hinge pin 7. For example, the present invention is also applicable to horizontal bandsaw machines in which a cutting head assembly is vertically moved in its entirety along a single or a plurality of vertical guide means such as a post or posts, and it is further applicable to vertical bandsaw machines in which a bandsaw blade travels vertically around upper and lower wheels.

In the arrangement described above, the guide assemblies 21 and 23 are so disposed as to slidably hold the bandsaw blade 11 at the cutting zone to keep the blade cutting edge faced perpendicularly toward the workpiece W but also to prevent the bandsaw blade 11 from moving laterally and vibrating. Also, the guide assemblies 21 and 23 are made to twist the bandsaw blade 11 at the cutting zone to keep its cutting edge faced vertically toward the workpiece W to be cut, since the shafts 17 and 19 of the driving and driven wheels 13 and 15 are disposed to be tilted in the preferred embodiment. Since the guide assemblies 21 and 23 according to the present invention may be of the same construction, descriptions will be made only with regard to the guide assembly 21 in reference to FIGS. 2 and 3.

Figure 2:
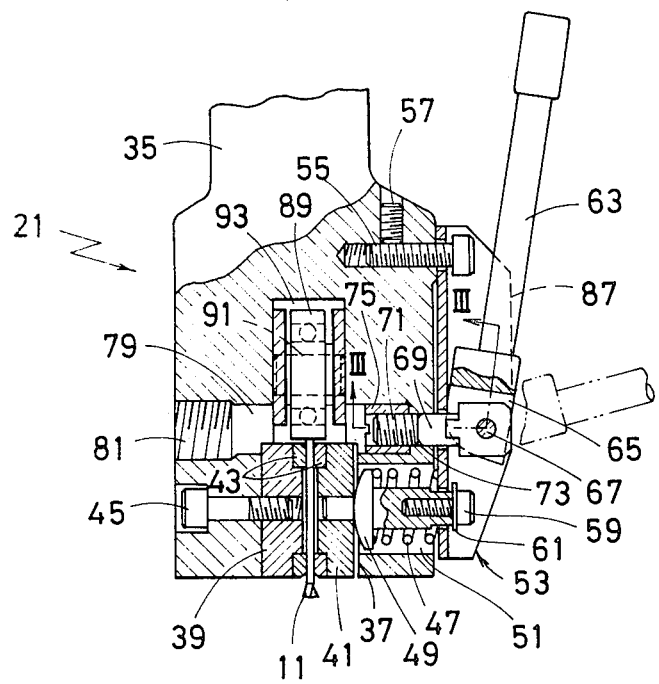
FIG. 2 is an enlarged sectional view taken on reference line II of FIG. 1.
Figure 3:
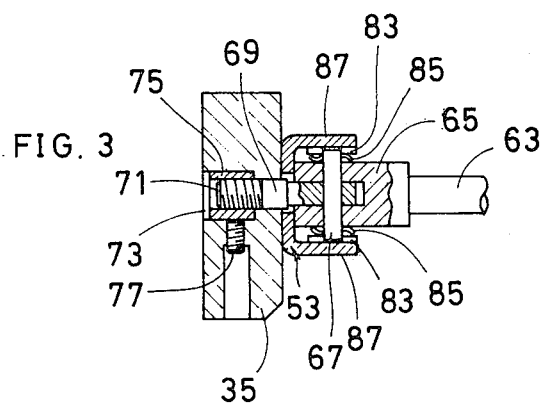
FIG. 3 is a sectional view taken along the line III—III of FIG. 2.

As best shown in FIG. 2, the guide assembly 21 is provided with a body 35 which may either be detachably fixed to or integrally formed with the lower end of the arm member 25 depending from the beam member 29. The body 35 of the guide assembly 21 is formed at its bottom with a downwardly opening concavity 37 in which a pair of fixed and movable guide members 39 and 41 are so mounted as to cooperate with each other to slidably hold the bandsaw blade 11 therebetween. Each of the fixed and movable guide members 39 and 41 is of a more or less rectangular block which is of a wear-resistant material in its entirety or otherwise is provided with a plurality of wear-resistant members 43 such as carbide tips to slidably hold and guide the bandsaw blade 11. The fixed guide member 39 is located on the back side of the bandsaw blade 11 and is fixed thereat by any conventional tightening means such as the bolt 45. The movable guide member 41 is located at the front side of the bandsaw blade 11 and is movably held in position by a suitable means such a horizontal pins in a manner such that it can be moved toward and away from the fixed guide member 39 to hold and release the bandsaw blade 11 in cooperation therewith. Also, the movable guide member 41 is so arranged as to be yieldably biased toward the fixed guide member 39 by a spring member 47 acting on a push member 49. The spring member 47 and the push member 49 are movably inserted in a horizontal bore 51 which is formed normal to the movable guide member 41 and which extends through the front lower portion of the body 35 into communication with the concavity 37. Thus, it will be now understood that the bandsaw blade 11 is slidably and resiliently held by and between the fixed and movable guide members 39 and 41 with its sides pressed thereby when the movable guide member 41 is biased toward the fixed guide member 39 by the spring member 47 through the push member 49.

The spring member 47 biasing the movable guide member 41 toward the fixed guide member 39 is so arranged as to be adjustably pressed and held in the bore 51 by an elongate pressing plate 53 which is vertically attached at the front face of the body 35. The pressing plate 53 is fixed at its upper end to the body 35 by a bolt 55 secured by a set screw 57 in a manner such that its lower portion pressing the spring member 47 can be slightly swung about the bolt 55 to compress and release the spring member 47. Also, the outer end of the push member 49 is so designed as to project out from the bore 51 through a hole in the pressing plate 53 and is loosely held through or connected with the pressing plate 53 by a bolt 59 and a washer 61. Thus, when the pressing plate 53 is pressed to compress the spring member 47, the movable guide member 41 is urged toward the fixed guide member 39 by the spring member 47 through the push member 49 to hold the bandsaw blade 11 in cooperation with the fixed guide member 39. Also, it will be understood that the movable guide member 41 will release the bandsaw blade 11 and can be moved away from the fixed guide member 39 when the spring member 47 is not held in a compressed state by the pressing plate 53.

In order to press and release the pressing plate 53, there is provided a lever member 63 which is provided at its end with a cam 65 for pressing and releasing the pressing plate 53. The lever member 63 is pivotally supported by a hinge pin 67 on a supporting member 69 which is horizontally connected at the front face of the body 35 through a bore formed through the pressing plate 53 above the push member 49. The cam 65 is so formed as to press the pressing plate 53 when the lever member 63 is raised as shown in FIG. 2 and release the same when the lever member 63 is lowered as shown by the imaginary lines in FIG. 2. The supporting member 69 supporting the lever member 63 is formed with a thread 71 and is placed in a horizontal bore 73 formed through the body 35, and the thread 71 of the supporting member 69 is adjustably engaged with a sleeve nut 75 which is rotatably provided in the body 35 to adjust the projection of the supporting member 69. The sleeve nut 75 is rotatably fixed by an adjustable set screw 77. Sleeve nut 75 may be adjusted by reaching through a horizontal bore 79 which is formed through the body 35 from the back side thereof to the sleeve nut 75 and is closed by a blank cap 81. Also, in order to hold the lever member 63 at the raised position, plain washers 83 and spring washers 85 are attached at both ends of the hinge shaft 67 and are held against the lever member 63 by a pair of flange-like projections 87 provided on the pressing plate 53. Thus, when the lever member 63 is raised as shown in FIG. 2, the cam 65 will press the pressing plate 53 to compress the spring member 47 and as the result the movable guide member 41 will be urged by the spring member 47 acting through the push member 49 to hold the bandsaw blade 11 in cooperation with the fixed guide member 39. Alternatively, when the lever member 63 is lowered around the hinge pin 67 as shown by the imaginary lines in FIG. 2, the cam 65 will release the pressing plate 53 and the spring member 47 to enable the movable guide member 41 to release the bandsaw blade 11. Also, it will be readily understood to those skilled in the art that the holding force of the movable guide member 41 on the bandsaw blade can be adjusted by rotating the sleeve nut 75 to adjust the projection of the supporting member 69 supporting the lever member 63.

In order to hold the back of the bandsaw blade 11, a roller or rollers 89 having a shaft 91 are rotatably provided in a concavity 93 formed in the body 35. Thus, the bandsaw blade 11 is guided by the fixed and movable guide members 39 and 41 slidably holding its sides and by the roller and rollers 89 rotatingly holding its back.

In the above described arrangement, the spring member 47 can be omitted if a resilient plate member such as a flat spring is used for the pressing plate 53 in such a manner as to be integrally connected with the push member 49 so that it may be resiliently bent to urge the push member 49 to the movable guide member 41 when the lever member 63 is raised. Also, it is possible to omit both the spring member 47 and the push member 49 by replacing the pressing plate 53 by a resilient plate which has been so formed as to be in contact with the movable guide member 41 to urge the bandsaw blade 11 when the lever member 63 is raised. In these modified embodiments, it is possible to fixedly dispose the supporting member 69 supporting the lever member 63 and make the bolt 55 adjustable so as to adjust the urging force of the movable guide member 41 to the bandsaw blade 11.

As has been far described in the above, the bandsaw blade guiding apparatus according to the present invention is so designed as to be operated by the lever member 63 having the cam 65 to hold and release the bandsaw blade 11, and it has many features over the prior art apparatus. It is only necessary to operate the lever member 63 to hold or release the bandsaw blade 11 when it is desired to install or detach the same in the horizontal bandsaw machine 1. Since the holding force of the guide members 39 and 41 to the bandsaw blade 11 can be adjustably set by adjusting the projection of the supporting member 67 pivotally supporting the lever member 63 by rotating the sleeve nut 75, the bandsaw blade 11 can be always most properly held with a predetermined force only by operating the lever member 63. Also, it can be easily seen from the status of the lever member 63 whether or not the bandsaw blade 11 has been held by the guide member 39 and 41 for cutting operations.

Furthermore, the bandsaw blade guiding apparatus according to the present invention is simple and compact in construction, and therefore it is not only almost free from troubles and hitches but also is inexpensive and economical.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. In a bandsaw machine having a bandsaw blade frictionally guided between a pair of opposed guide members, one of said guide members being urged toward the other of said guide members by resilient means coactively associated with support means, the force exerted on said one guide member by said resilient means being variable by positionally adjusting said support means, the improvement comprising: said support means being pivotally mounted and being urged by said resilient means into contact with a lever-actuated rotatable cam, with rotation of said cam resulting in the aforesaid positional adjustment of said support means.

2. The apparatus of claim 1 wherein said support means is pivotally mounted at a position spaced from the position of said one guide member, with the rotational axis of said cam being arranged between said positions.

3. The apparatus of claim 1 wherein said resilient means comprises a spring member compressively retained between said one guide member and said support means.

4. The apparatus in accordance with any of the preceding claims further comprising means for movably adjusting the rotational axis of said cam in relation to the pivotal mounting of said support means.

* * * * *